United States Patent

Stoll et al.

[11] 4,418,711
[45] Dec. 6, 1983

[54] VALVE INSERT AND VALVES DESIGNED THEREWITH

[76] Inventors: Kurt Stoll, Esslingen; Manfred Rüdle, Esslingen-Berkheim, both of Fed. Rep. of Germany

[21] Appl. No.: 246,966

[22] Filed: Mar. 24, 1981

[30] Foreign Application Priority Data

Mar. 27, 1980 [DE] Fed. Rep. of Germany ....... 3011791

[51] Int. Cl.³ ............................................ F15B 13/042
[52] U.S. Cl. ................................ 137/269; 137/625.66; 137/625.69; 251/DIG. 1
[58] Field of Search .............. 137/269, 625.66, 625.69; 251/DIG. 1

[56] References Cited

U.S. PATENT DOCUMENTS

| | | | |
|---|---|---|---|
| 2,928,380 | 3/1960 | Krapf | 137/625.69 |
| 3,516,442 | 6/1970 | Munroe | 137/625.66 |
| 3,542,073 | 11/1970 | Holbrook | 137/625.66 |
| 3,938,553 | 2/1976 | Ortega | 251/DIG. 1 X |
| 4,103,711 | 8/1978 | Arvin | 137/625.66 |
| 4,254,799 | 3/1981 | Blatt | 137/625.66 X |
| 4,287,906 | 9/1981 | Green et al. | 137/625.69 X |

FOREIGN PATENT DOCUMENTS 1245665 7/1967 Fed. Rep. of Germany.

Primary Examiner—Gerald A. Michalsky
Attorney, Agent, or Firm—Flynn, Thiel, Boutell & Tanis

[57] ABSTRACT

A valve insert is designed for use in valve casings for making up air valves which may be controlled by air under pressure or by a mechanical system and which are normally open or closed. The valve insert is made up of a housing, which is open at its two ends and has two groups of outwardly running openings, which are separated from each other by an outer gasket ring. The valve further has a spool with sealing rings. One end the spool has a hook having a neck part which is spaced from the spool axis and a hook end which is normal to the neck part. The end part of the hook extends past the axis of the spool a distance which is at least equal to the distance of the neck part of the hook from the axis of the spool. The diameter of the hook end is somewhat smaller than the distance between the hook end and the end face of the spool. The sealing rings are so placed that, on operation of the valve and motion of the spool, one inner sealing ring is moved over one group of openings.

7 Claims, 6 Drawing Figures

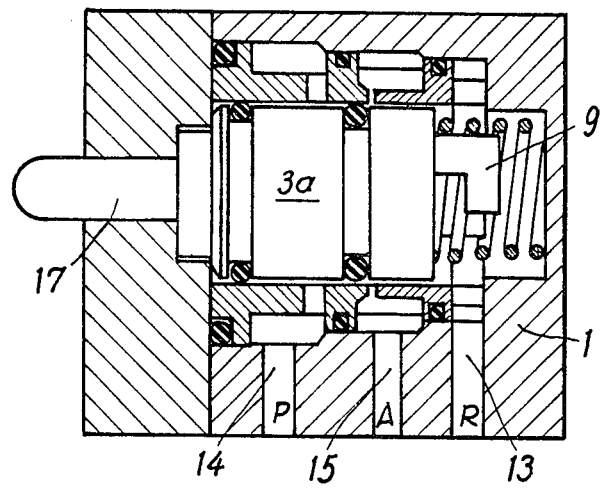
Fig. 3
Fig. 4
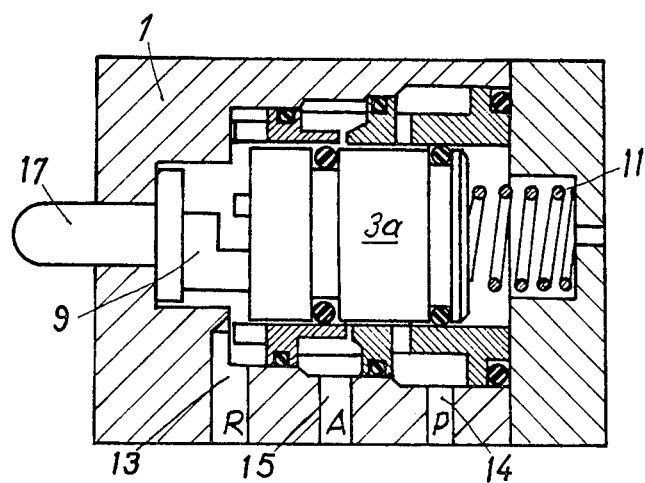

VALVE INSERT AND VALVES DESIGNED THEREWITH

FIELD OF THE INVENTION

The invention relates to a valve insert, more in particular an insert which can be positioned within a casing to make up an air or other valve which is actuated mechanically or by way of a control airway and in the normal or resting position is completely open or completely shut. Furthermore the invention relates to a valve made up with such a valve insert.

BACKGROUND OF THE INVENTION

Valves are used for controlling the motion of liquids or gases in piping or the like as may be desired. In classifying such valves, one important point is for example the number of connections such valves have. For example a three-way valve is a valve with three connections, that is to say an inlet connection (P), a connection (A) for joining with a cylinder and piston actuator and an outlet or left off connection (R). A five-way valve has five connections, that is to say an inlet connection (P), two cylinder actuator connections (A,B) and two outlet connections (R, S), such valves being used for example for the operation of double-acting piston cylinder actuators. Operation of the valve, that is to say putting it into the desired condition of switching from the outside, may be undertaken in a number of different ways, for example by hand, this being the simplest case, mechanically (using for example a cam) or by air power (using for example compressed air) or control may be electrical using a timer. So it will be seen that there is a large number of different sorts of valves which may be put into different groups dependent on the number of connections, the number of positions or settings and the way of operation.

SUMMARY OF THE INVENTION

One purpose of the present invention is that of designing a valve insert which may be simply produced, which has the largest number of possible uses and, more specially, may be simply used not only as a three/two, but furthermore as a five/two-way valve and whch is so designed as to take care of tolerances of the valve casing placed round the insert.

A further purpose of the present invention is that of producing high-quality sealing and gasketing even so that the insert may be placed in its casing without any trouble conditions.

A still further purpose of the invention is that of making up different sorts of valves using the valve insert of the present invention.

For effecting these and other purposes, the valve insert of the present invention is made up of a housing, open at each end, having two groups of openings (although in some cases only two openings in all may be present) designed running radially outwards through the housing, in which a spool is placed which has two inner sealing rings on it for sealing against a bore of the housing. One end of the spool has a hook running in the direction of motion of the spool, the hook having a neck or short part and a hook end, an end face on the hook end being on one side of the axis of the spool, while the neck is on the other side of the axis, the distance between the end face of the hook end and the axis being at the most equal to the distance between the axis and the hook neck, while the diameter of the hook end is somewhat smaller than the distance between the hook end and the end face of the spool. The inner sealing rings are so placed that, on motion of the spool on operation of the valve, an inner sealing ring is moved over one group of openings. In the present invention, the word "spool" is used for a valve part which is a solid body able to be moved in the valve housing along a straight line for causing switching operation of the valve. The spool is moved as a complete structure by an outside force. The useful effect of the valve insert of the present invention is to be seen more specially in that it may be used in valves whose designs are different with respect for example to the number of connections, the way in which the valve is controlled and the condition in which the valve normally is placed, that is to say the resting condition. A further useful effect is that it may be produced in a simpler way than prior art valves. More specially, the invention is responsible for the useful effect that the valve insert may be used not only in three-way, but furthermore in five-way valves simply by joining together two valve inserts, something which will be made clear in more detail using working examples. By placing inner sealing rings between the spool and the valve housing and outer gasket rings on the housing, tolerances may, to a large degree, be taken care of.

A more specially useful effect is produced if, as part of the invention, the housing and the spool are made cylindrical and the sealing and gasket rings are in the form of circles.

In the case of a further working example of the invention, the housing may have, at its two ends or outer edges, two further outer gasket rings. As has been made clear, there is one gasket ring on the outer side of the housing, which has the function of separating the two groups of openings from each other so that, on having a further outer gasket ring at each of the end edges of the housing as put forward, there will in all be three outer gasket rings to make certain that, on placing such an insert of the invention in a valve casing, two spaces are produced which are shut off from each other.

Along with a further development of the general teaching of the invention, the housing is stepped and becomes narrower towards the hook. In the case of such a design, it is, on the one hand, possible for the housing and its valve casing to be produced with stepped tools and, on the other hand, inserting the insert into its valve casing is made simpler if, as in a further part of the invention, on each step an outer gasket ring is positioned because, in this case, the separate rings will take their sealing effect on different diameters and, for this reason, will not be forced directly over the radial hole ends which have not been deburred and thus will not be damaged. A specially useful effect is produced in this connection if, as part of the invention, the housing has three steps.

As part of a further development of the invention, the valve insert has keying lips for action at least on the inner sealing rings and stopping them being twisted and turned as the spool is moved backwards and forwards. Furthermore, in the case of rings made of synthetic resin, any flaws produced on parting the molds used for making the resin rings are fully taken care of, because the molds may be so designed that the burr or flash still on the ring takes the form of the sealing lip.

A further useful effect may be produced if the housing has outer grooves for joining together the openings of each group and on placing the valve insert into its casing, ring-like hollows or plenum spaces are formed which joins together all the openings of one group. In this case for joining up one group with the outside, it is only necessary to have a single airway running through the valve casing.

Lastly, there is the further suggestion forming part of the teaching of the present invention for the spool to be made hollow and/or to be designed so as to be open at the end opposite to the hook. The purpose of this suggestion is that of decreasing the inertia of the spool so that the valve may be moved by a small force and/or have a quick response.

An account will now be given of some sorts of different valves which may be produced using the valve insert of the present invention and which may be used for a large number of different uses. The first sort of valve which may be produced with the insert of the invention is a normally shut three/two-way air valve or pneumatic valve, made up of a normal valve casing and a valve insert therein. As part of the invention, between the hook and the inner side of the valve casing, a spring is placed within a space with an airway running off to the outside and furthermore the two groups of openings have their own airways joined up with the outside of the valve. At the end of the spool opposite to the hook there is a space within the valve casing joined up with a control airway. In the normal or resting condition of the valve, by way of the spring at one end of the spool, the end of the spool opposite to the hook is forced against the valve casing so that the two sealing rings will take up positions on the two sides of the group of openings joined up with the supply airways. Thus, in this condition of switching, there is no connection between the supply airways and the airways joined with the piston cylinder actuators. In other words, this valve is shut off in the normal or resting condition. On a great enough pressure being produced in the control airway the spool will be moved against the spring force and as soon as one of the sealing rings has been moved over the openings joined with the airway joined with the actuator, the supply airways will be joined up with the cylinder actuator airway so that the actuator will be powered. To make possible free movement of the spool and for stopping any changes in the pressure value, the space in which the spring is placed is joined up with an airway to the outside.

The next valve forming part of the invention is a normally open, three/two-way air valve, in the case of which between the end, opposite to the hook, of the spool and the inner face of the valve casing there is a spring and the group of openings on the one side of the hook is joined up with airway to the cylinder actuator, while the other group of openings is joined up with a supply airway or airways. The hook, because of the force of the spring, is in all conditions of operation kept forced against a diaphragm or a separating piston within a bore in the valve casing, and the space between the casing and the diaphragm or separating piston is joined up with a control inlet airway and the space within which the hook is placed is joined up with an outlet airway. In the normal condition, that is to say without any pressure input to the control airway, the force of the spring is responsible for keeping the spool in a position in which the supply airways are joined with the airways to the actuator, that is to say so that the actuator is supplied with compressed air. If compressed air is supplied by way of the control airway, the diaphragm or separating piston is moved and because the hook is resting against it, the spool will be moved against the spring so that the connections between the airways to the actuator and the supply airways are shut off and it will now be possible for air to be let off from the actuator by way of the airway to the actuator and the let-off airway. In this case as well, for stopping undesired changes in the pressure level which might have the effect of stopping motion of the spool, the space in which the spring is placed has to have an airway joining it up with the outside.

In a further development of the teaching of the invention, a normally shut and a normally open three/two-way plunger valve are made possible, which are largely the same as the normally closed and normally open three/two-way valves controlled by compressed air, the only difference being that in place of the control airway, there is a plunger able to be moved in the direction of motion of the spool, so as to be responsible for operation of the valve.

One more specially useful point in connection with the present invention is that the spring used for acting against the hooked end of the spool may be a coil spring placed round the hook itself.

The last form of valve put forward by the present invention is a five/two-way pulse valve, in the case of which two valve inserts of the present invention are joined together by the hooks of their coils being hooked together and ganged, the space in which the hooks are placed being joined up with a supply airway and the two groups of openings on the two sides of the hooks being joined up with airways to the cylinder actuator or actuators. The other group of openings are joined up with outlet airways and the space formed by the end faces, opposite to the hooks, of the spools and the valve casing is joined up, in each case, with a control airway. This valve is different from the three-way valve noted earlier inasfar as there are five connections in addition to the connections for the control airways, two of these five connections being connections to the cylinder actuator and two being outlet connections. Because of the use of two valve inserts of the invention which are quite the same and which are joined together at their ends by way of their hooks, the valve designed is symmetrical about its middle. The outcome of this is that at any given time only one of the actuator connections is joined up with the inlet connection and at the same time the other actuator connection is joined up with the air outlet connection.

Part of the reasoning on which the new valve of the present invention is designed is based on an attempt at producing the simplest possible form of valve insert, which may be used for a wide range of different purposes. In this respect, it has turned out that a valve insert with a three/two-way function gives the widest range of possible uses. At the same time, however, it has been possible to produce, in a simple way, a five/two-way valve. This purpose has been effected by the gripping hooks as noted. In addition to the joining up function, this hook arrangement furthermore has the purpose of taking care of any out of line condition of the two holes on the right and the left in the casings. To make this clearer, it may be taken into account in this connection that, to make the casing in the simplest possible way, the holes in which the inserts of the valves are received, are drilled from the left and right with a stepped tool. In this respect, because of technical machining reasons, the holes will be out of line to a certain degree and this out-of-line condition has to be taken into account to make certain that all the sealing and gasket rings have their desired function. The stepped bore or hole is responsible for the useful effect that each other O-ring gasket of the valve insert is only used for sealing at a certain diameter, thereby avoiding damage to the O-ring gaskets which might otherwise be caused by radial hole ends which have not be deburred and over which the O-rings would otherwise be scraped. As a further special measure, the valve insert of the invention has a dynamic or sliding O-ring acted upon by a keying lip, which has two purposes, namely (1) stopping any turning or twisting of the O-ring gasket and (2) overcoming any trouble conditions which would otherwise be produced by parting errors on molding the rings of plastic or synthetic resin.

BRIEF DESCRIPTION OF THE DRAWINGS

An account will now be given of the invention in more detail using working examples which are to be seen diagrammatically in the figures.

FIG. 3 is a view of a normally shut three/two-way plunger valve in the case of which the spool and the plunger are to be seen in side view and the rest of the parts of the valve in section.

FIG. 4 is a view of a normally open three/two-way plunger valve in a view similar to FIG. 3.

DETAILED DESCRIPTION

Figure 1:
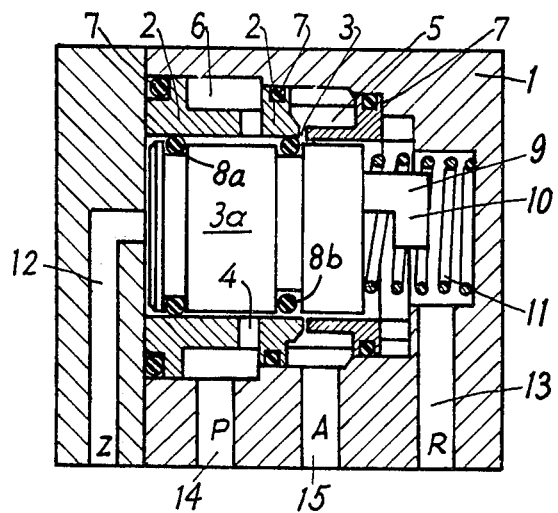
FIG. 1 is a view of a normally shut three/two-way air valve in the case of which the valve casing and the housing of the valve insert will be seen in cross-section and the spool thereof is to be seen in side view.

In FIG. 1 a valve casing 1 is to be seen in section, and covers up the valve insert of the invention on all sides. This valve insert is made up of a sleeve or housing 2, which is open at its two ends towards the casing and has a bore which, for its full length, has the same diameter, while the outer face of the housing is stepped, it more specially having three diameter steps. Each of these steps may be thought of as a ring on the outer face of housing 2, the three rings being concentric and decreasing in radius towards the right. In housing 2 there are at the top and lower sides two radially running equally spaced openings 3, 4. The right hand and the left hand openings 3, 4 are joined together by ring-like grooves 5, 6, even though this is not made fully clear in this figure, these openings 3 and 4 running into spaces each limited on their two sides by gasket rings 7, there being such outer gasket rings in the present case. Inside the housing 2 of the valve insert there is a spool 3a which may be moved in its length-direction and whose outer diameter is somewhat smaller than the inner diameter of housing 2. For guiding motion of spool 3a and for sealing off the hollows formed between the spool 3a and the housing 2, there are two inner sealing rings 8a and 8b, such rings each being in the form of a complete ring structure and being placed, on the one hand, near the left hand end of the spool and, on the other hand, about one third of the length along the spool as measured from the right hand end. At the right hand end, spool 3a has a hook 9 which is fixed in position so as to be generally eccentric, it having at its end a downwardly pointing hook end 10 which extends past the axis of the spool by an amount which is generally equal to the least distance of hook 9 from this axis. At the same time the diameter of hook end 10 is somewhat smaller than the distance between hook end 10 and the end face of spool 3a so that two spools 3a may be joined together by way of their hooks 9, such hooks 9 on the ends of two spools 3a oriented to face each other being opposite in form and locking into each other. Hook 9 has a coil spring 11 placed round it, one end thereof resting against the end face of spool 3a and the other end resting against the inner face of casing 1 so that, in the normal position, the opposite end of spool 3a will be resting against the valve casing 1.

Operation of the valve takes place by way of a control line "Z" identified by reference numeral 12 extending through the valve casing 1 and coming to an end at the inner side of the valve casing 1 facing to the end of spool 3a which is opposite to hook 9. When control line 12 is put under pressure for a given time, the spool 3a is moved to the right against the force of coil spring 11 at its other end, the space in which coil spring 11 is placed being joined up with a space outside the valve. Because the pressure operation and, for this reason, the control of the valve takes place by the use of air, the valve is named an air valve or pneumatic valve.

The ring-like or annular grooves 5 and 6 joined up with the right hand and the left hand openings 3 and 4 are as well joined up with the outer space, that is to say the left hand groove is joined up by way of airway 14 (marked P) and the right hand groove 5 is joined up by way of airway 15 (marked A) with an actuator in the form of a piston and cylinder (not illustrated). In the normal condition, the right hand, inner sealing ring 8b is positioned between the openings 3 and 4 joined up with these two airways, so that airway 14 is shut off, it being a question of a valve which is normally shut. On operation of the valve, sealing ring 8b is moved in the invention to the right over openings 3 which are joined up with airway 15 (marked A) to the actuator so that a connection is produced between inlet airway 14 and the airway 15 to the actuator so that the actuator gets the compressed air by way of airway 14 marked P. In the normal condition, the airway 15 to the actuator is joined up with the outlet airway 13 (marked R) running into the space in which spring 11 is housed so that the pressure in the cylinder actuator is let off and the air within it may have its pressure decreased to that of the atmosphere. Because the valve, in addition to the control airway 12 (marked Z), which is used for control (although as will be made clear later on, such control might be caused in a different way), has the inlet airway or line 14 for compressed air, the airway 15 going to the cylinder actuator and an outlet airway 13, that is to say in all has three airways or lines and two end or switching positions, the valve is named a normally shut three/two-way valve.

Figure 2:
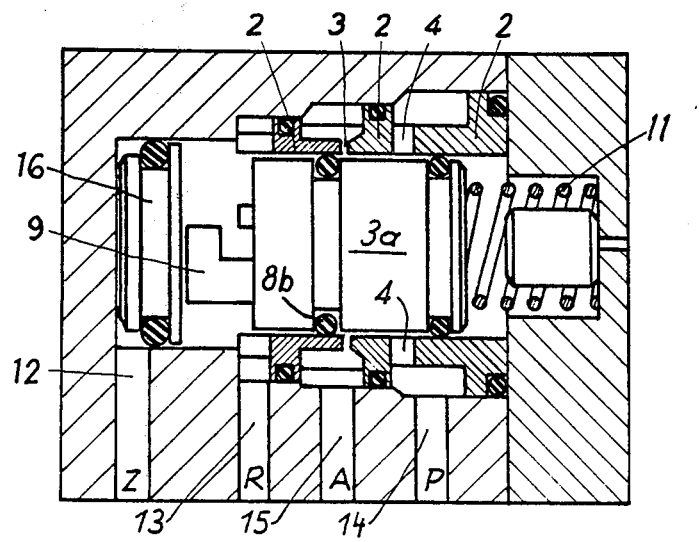
FIG. 2 is a view of a normally open three/two-way air valve in which the valve casing and the housing are to be seen in section and the spool and the separating piston or membrane are to be seen in side view.

The valve insert to be seen in FIG. 2 is generally the same as that to be seen in FIG. 1, but the housing is placed the other way round in the casing, coil spring 11 resting against the end of spool 3a which is opposite to hook 9 and hook 9 running up against a separating piston 16 or "diaphragm" having the function of separating two spaces from each other, of which the left hand space may be supplied with air by way of control airway 12 (marked Z) while the right hand one is joined up by way of outlet airway 13 (marked R) with the outer space. Separating piston 16 may be moved in the same direction as spool 3a. The system is furthermore different to that of FIG. 1 inasmuch as the inner sealing ring 8b, nearest the hook 9, goes into a position to the left of the openings 3 and 4 which are joined up with the outside by way of airways 14, 15 (marked A and P) when the valve goes into its normal position so that airway 14 is directly joined up by way of cylinder airway 15 and the cylinder actuator. On operation of the valve, this inner sealing ring 8b goes into a position between openings 3 and 4 so that airway 14 (marked P) is shut off and air is let off from the cylinder actuator by way of airways 13, 15 (marked A, R). For this reason, the air valve of FIG. 2 may be said to be a normally open three/two-way valve.

The valve, to be seen in FIG. 3 is different to that seen in FIG. 1 inasmuch as the valve operation is not caused by air but by way of a plunger or tappet 17 designed for motion in the same direction as that of spool 3a and resting against the end of spool 3a opposite to hook 9. The valve may be said to be a plunger or tappet valve for this reason.

In the valve of FIG. 4 as well, operation is again by way of plunger 17 moving in the same direction as spool 3a and resting, in this case, against the hook 9 of the spool. But for the control airway 12 (marked Z) for control pressure and the moving separating piston 16, the valve of FIG. 2 is the same as that of FIG. 4 so that this valve in FIG. 4 may be said to be a normally open three/two-way plunger valve.

Figure 5:
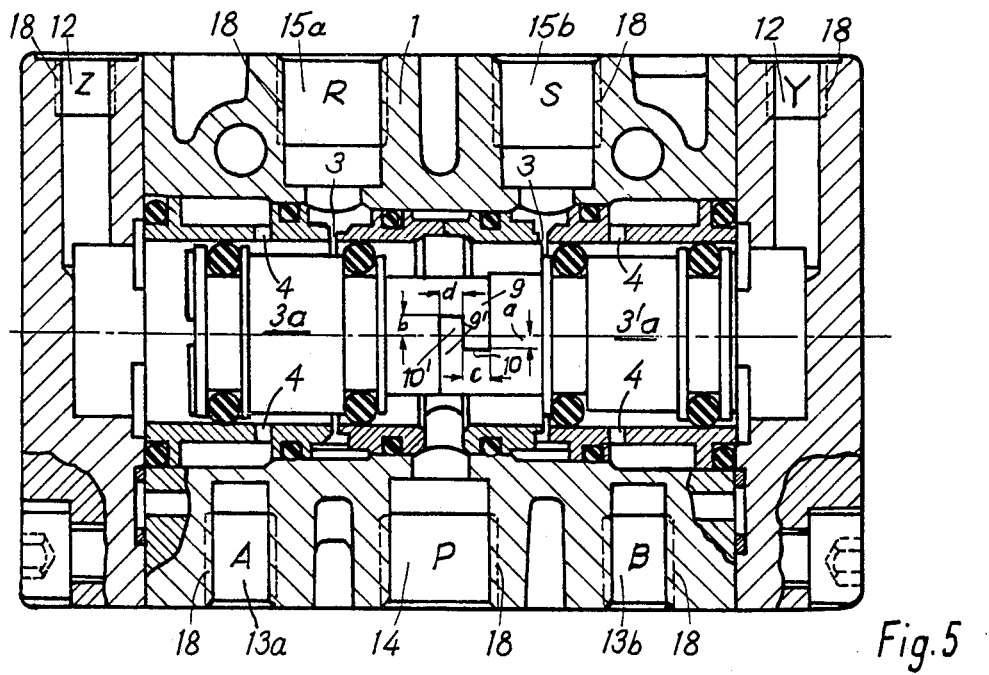
FIG. 5 is a view of a compound five/two-way pulse valve of the invention made up of two valves, as for example those of FIGS. 1 and 2, the valve casing and the housing of the valve insert being viewed in section and the two spools being viewed from the side.

FIG. 5 is a diagrammatic view of a five/two-way pulse valve having two valve inserts housed in a valve casing 1. One of the more important useful effects of the present invention is its teaching with respect to the design of a valve insert which may be used for a number of different purposes and which may be used not only in three/two-way valves, more specially plunger or air operation, but furthermore for use in five/two-way valves. For this purpose, two valve inserts of the invention, which may be used for three/two-way valves, are joined together by their hooks 9 at the end of spools 3a. The design of these hooks has been detailed earlier in connection with FIG. 1. For connection together, the hook end 10 of hook 9 of the one spool 3a is hooked into the space between the hook end 10' of hook 9' of the other spool 3'a and the end of the spool 3'a. Because of the geometry of the hooks 9, 9' at hook ends 10, 10', the two spools 3a and 3'a of the valve inserts of the invention take the form of a single body with a common function after being so joined up. These two spools 3a, 3'a joined together by way of their hooks 9, 9' and used in five/two-way pulse valves are housed, in each case, in a valve casing to be seen in section, while the spools are to be seen in side view.

In other respects, that is to say not taking into account their being hooked together by hooks 9, 9' on spools 3a, 3'a, the valve inserts of FIG. 5 are the same as detailed in FIGS. 1 to 4.

The valve casing 1 is of such a form inside that the two valve inserts of the invention may be fitted in it for communication with five airways 13a, 13b, 14, 15a, 15b (this being responsible for the name five-way valve) which, at their outer ends, have female threads 18 for joining up with pressure hoses or other piping. Because the valve figured is worked pneumatically, there are two further control airways 12 (marked Y and Z) opening horizontally into the casing at the ends of the spool so that motion of the spool may be caused by control pressure for operation of the valve. Two of the first-noted five airways are designed to extend radially and upwards (airways 15a and 15b), the other three airways running radially downwards (airways 13a, 13b and 14), the middle airway 14 being used for introducing compressed air (so that airway 14 is marked P) and the two other airways 13a and 13b, joined up with the outside, being used for letting off air from the two cylinder actuators, while the two upwardly running cylinder actuator airways 15a and 15b are used for supplying compressed air to the actuator.

In the condition of operation to be seen in FIG. 5, it may be seen from the position of the spool or spools 3a, 3'a that there is a connection between the actuator airway 15b and the inlet airway 14 or supply line so that the cylinder actuator will get compressed air by way of actuator airway 15b, while the cylinder actuator joined up with actuator airway 15a will be able to let off its air by way of outlet airway 13a. For this reason, on operation of the valve, spool 3a is moved in its lengthways direction to the left so that the actuator airway 15a is joined up with compressed air inlet airway 14 (marked P) and the actuator airway 15a is joined up with the air outlet airway 13b.

Because of the symmetry of the design generally and, more specially, of the valve inserts, only one cylinder actuator is supplied with compressed air at a time, while air is left off from the other cylinder actuator.

As may be seen from the figures, more specially FIG. 5, the hooks for joining the two spools 3a and 3'a together are so designed that (a) the distance of the end face of the hook end 10 from the axis of the spool is at the most equal to the distance of the hook (distance b) from the spool axis; and (b) the diameter of the hook end (distance c) is slightly less than the distance between the hook end and the end face of the spool (distance d).

Figure 6:
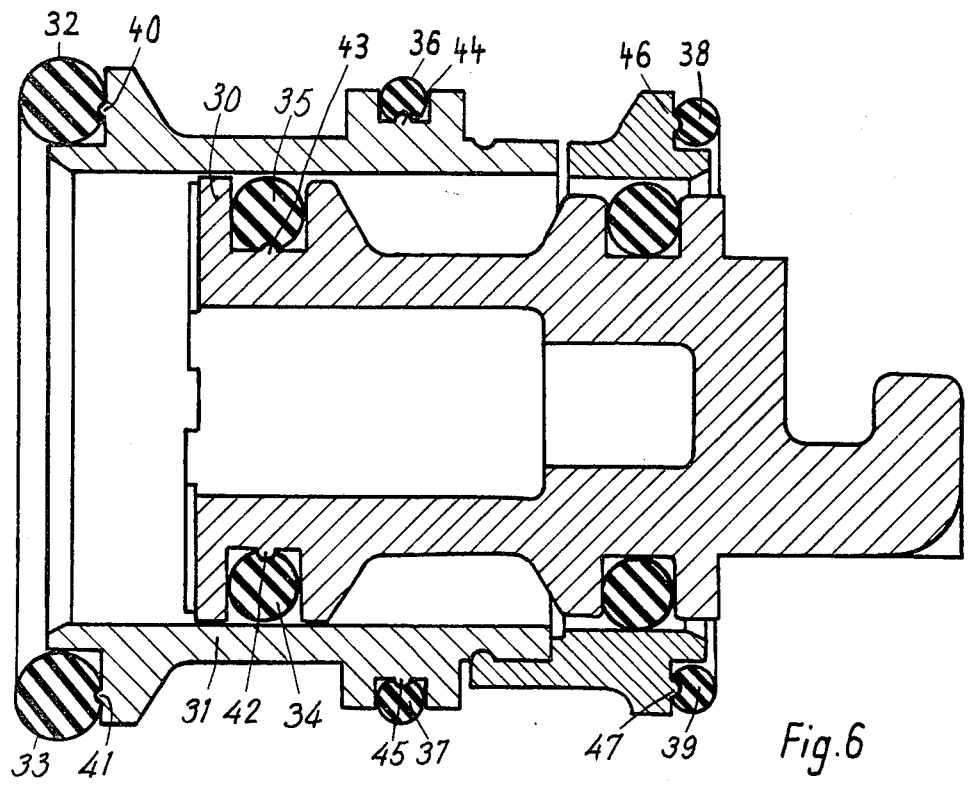
FIG. 6 is a view of a detail of a further form of the invention from the side and in axial section on a greater scale.

FIG. 6 is a view of a further structure of the invention to make clear a further important measure of the invention. In the case of the spool 30 and the housing 31, the sliding O-rings 32,33,34,35,36,37,38 and 39 are keyed against lips or projections 40, 41,42,43,44,45,46 and 47 on the supporting structure. This stops any turning or twisting of the ring in question, while on the other hand the danger of separation is overcome which might otherwise be caused by shortcomings in the form of the rings (that is to say caused on parting the molds used for making the plastics rings).

The embodiments of the invention in which an exclusive property or privilege is claimed are defined as follows:

1. In a five-way slide valve device which includes a valve casing having a bore therein, a sleeve which is fixedly arranged in said bore in said valve casing, is open at its ends, and has several radial openings therethrough which are separated by first annular seals provided around said sleeve and sealingly engaging said sleeve and casing, said radial openings communicating with respective bores provided in said valve casing, and a slide valve axially slidably supported in said sleeve and having second annular seals therearound which are movable therewith and sealingly engage said sleeve and said slide valve, wherein one said radial opening is a pressure medium inlet and said slide valve device is symmetric about a radial plane which contains said pressure medium inlet, the improvement comprising wherein said sleeve and said slide valve each include two identical parts which are arranged in mirror-image relationship with respect to said radial plane which contains said pressure medium inlet, said slide valve parts each having a hook on the end thereof adjacent the other slide valve part, said hooks being identical and said slide valve parts being releasably connected by said hooks, said hooks having means for substantially preventing relative axial movement between said slide valve parts but permitting relative radial movement therebetween.

2. The valve device according to claim 1, wherein said bore in said valve casing and the outer surface of each said sleeve part are tapered in a steplike manner toward said radial plane.

3. The valve device according to claim 1, wherein said means for preventing relative axial movement but permitting relative radial movement includes each said hook having a shank portion and an end portion, said end portion of each said hook extending at approximately a right angle with respect to the direction of movement of said slide valve and projecting past a longitudinal axis of said slide valve, the distance between said shank portion of said hook and said longitudinal axis of said slide valve being greater than the distance that said end portion projects beyond said longitudinal axis.

4. The valve device according to claim 3, wherein said means for preventing relative axial movement but permitting relative radial movement includes the dimension of each said end portion of said hook in a direction parallel to said longitudinal axis being substantially equal to the distance between said end portion of said hook and the adjacent end of the associated slide valve part.

5. The valve device according to claim 1, including circumferential grooves in said sleeve parts and slide valve parts which extend therearound and receive said annular seals, and including an annular projection in each groove which engages the associated annular seal and resists twisting and turning thereof.

6. The valve device according to claim 1, wherein each said hook is an integral part of the associated slide valve part.

7. The valve device according to claim 1, wherein each said slide valve part is hollow.

* * * * *